United States Patent
Balakrishnan et al.

(10) Patent No.: US 11,489,736 B2
(45) Date of Patent: Nov. 1, 2022

(54) SYSTEM AND METHOD FOR MANAGING COMPUTING DEVICES

(71) Applicant: Core Scientific, Inc., Bellevue, WA (US)

(72) Inventors: Ganesh Balakrishnan, Sammamish, WA (US); Kristy-Leigh Minehan, Kirkland, WA (US); Evan Adams, Seattle, WA (US); Gabrielle Gordon, Seattle, WA (US)

(73) Assignee: Core Scientific, Inc., Bellevue, WA (US)

( * ) Notice: Subject to any disclaimer, the term of this patent is extended or adjusted under 35 U.S.C. 154(b) by 0 days.

(21) Appl. No.: 16/707,904

(22) Filed: Dec. 9, 2019

(65) Prior Publication Data

US 2021/0028983 A1     Jan. 28, 2021

Related U.S. Application Data

(60) Provisional application No. 62/877,737, filed on Jul. 23, 2019.

(51) Int. Cl.
*H04L 41/22*     (2022.01)
*H04L 41/0631*     (2022.01)
(Continued)

(52) U.S. Cl.
CPC .......... *H04L 41/22* (2013.01); *G06F 11/3006* (2013.01); *G06F 11/323* (2013.01);
(Continued)

(58) Field of Classification Search
CPC ............... H04L 41/0823; H04L 41/046; H04L 41/0876; H04L 41/16; H04L 41/20;
(Continued)

(56) References Cited

U.S. PATENT DOCUMENTS 6,744,436 B1    6/2004    Chirieleison, Jr. et al.
7,652,889 B2    1/2010    Larson et al.
(Continued)

FOREIGN PATENT DOCUMENTS

| WO | 17151161 A1 | 9/2017 |
| WO | 2018182357 A1 | 10/2018 |
| WO | 19033116 A1 | 2/2019 |

OTHER PUBLICATIONS

Transcript with selected screenshots of "Firmware for ASIC S9. 20 Th/s." video posted to Youtube on Apr. 16, 2019; <https://www.youtube.com/watch?v=Sp_vg5_3IU4>; accessed Mar. 29, 2021.
(Continued)

*Primary Examiner* — Tan Doan
(74) *Attorney, Agent, or Firm* — Fishman Stewart PLLC

(57) ABSTRACT

A system and method for easily managing a data center with multiple computing devices such as cryptocurrency miners from different manufactures is disclosed. A first computer includes a management application to manage the selected computing devices and periodically read and store status information from them into a database. Controls are presented to enable selection of one or more of the devices and to apply an operating mode, including manual, semi-automatic, automatic, and intelligent modes. Machine learning may be used to determine recommended settings for the selected set of computing devices.

20 Claims, 4 Drawing Sheets

(51) Int. Cl.
| | |
|---|---|
| *H04N 1/00* | (2006.01) |
| *G06F 11/30* | (2006.01) |
| *H04L 41/14* | (2022.01) |
| *G06F 11/34* | (2006.01) |
| *G06T 17/00* | (2006.01) |
| *G06T 19/00* | (2011.01) |
| *G06F 11/32* | (2006.01) |
| *G06N 20/00* | (2019.01) |
| *H04L 41/046* | (2022.01) |
| *H04L 41/0823* | (2022.01) |
| *H04L 41/08* | (2022.01) |
| *H04L 41/16* | (2022.01) |
| *H04L 41/00* | (2022.01) |
| *H04L 43/04* | (2022.01) |
| *H04L 43/065* | (2022.01) |
| *H04L 43/0817* | (2022.01) |
| *G06F 9/4401* | (2018.01) |

(52) U.S. Cl.
CPC ......... *G06F 11/3495* (2013.01); *G06N 20/00* (2019.01); *G06T 17/00* (2013.01); *G06T 19/006* (2013.01); *H04L 41/046* (2013.01); *H04L 41/0631* (2013.01); *H04L 41/0823* (2013.01); *H04L 41/0876* (2013.01); *H04L 41/145* (2013.01); *H04L 41/16* (2013.01); *H04L 41/20* (2013.01); *H04L 43/04* (2013.01); *H04L 43/065* (2013.01); *H04L 43/0817* (2013.01); *H04N 1/0049* (2013.01); *G06F 9/4401* (2013.01)

(58) Field of Classification Search
CPC ....... H04L 41/22; H04L 43/04; H04L 43/065; H04L 43/0817; G06N 20/00; G06F 11/3006; G06F 11/3495; G06F 9/4401
USPC .......................................................... 709/221
See application file for complete search history.

(56) References Cited

U.S. PATENT DOCUMENTS

| | | | | |
|---|---|---|---|---|
| 10,503,942 | B1* | 12/2019 | Thurston | G06F 11/3058 |
| 10,630,566 | B1 | 4/2020 | Nguyen | |
| 2004/0160897 | A1 | 8/2004 | Fowler et al. | |
| 2005/0114502 | A1 | 5/2005 | Raden et al. | |
| 2006/0020807 | A1* | 1/2006 | Aura | H04L 63/123 |
| | | | | 713/176 |
| 2007/0101173 | A1* | 5/2007 | Fung | G06F 1/3209 |
| | | | | 713/300 |
| 2009/0045967 | A1 | 2/2009 | Bandholz et al. | |
| 2009/0144568 | A1 | 6/2009 | Fung | |
| 2010/0287093 | A1 | 11/2010 | He et al. | |
| 2011/0057803 | A1 | 3/2011 | Yamaoka et al. | |
| 2013/0211870 | A1 | 8/2013 | Lawson et al. | |
| 2014/0149493 | A1 | 5/2014 | Acer et al. | |
| 2014/0222745 | A1 | 8/2014 | Deng et al. | |
| 2014/0281644 | A1* | 9/2014 | Rallo | G06F 1/3206 |
| | | | | 713/340 |
| 2015/0170112 | A1 | 6/2015 | DeCastro | |
| 2015/0215032 | A1* | 7/2015 | Bevilacqua | H04J 14/0267 |
| | | | | 398/5 |
| 2015/0261269 | A1* | 9/2015 | Bruscoe | G06Q 20/065 |
| | | | | 361/679.47 |
| 2015/0324712 | A1* | 11/2015 | Agarwal | G06Q 10/067 |
| | | | | 705/7.22 |
| 2016/0142884 | A1 | 5/2016 | Sears | |
| 2016/0170468 | A1 | 6/2016 | Bhandaru et al. | |
| 2016/0337210 | A1 | 11/2016 | Koplin et al. | |
| 2017/0103458 | A1 | 4/2017 | Pierce et al. | |
| 2017/0192928 | A1 | 7/2017 | Arnouse | |
| 2018/0284737 | A1* | 10/2018 | Cella | G05B 19/4183 |
| 2019/0370793 | A1 | 12/2019 | Zhu et al. | |
| 2020/0013027 | A1 | 1/2020 | Zhu | |
| 2020/0042416 | A1 | 2/2020 | Satoyama et al. | |
| 2020/0258013 | A1 | 8/2020 | Monnett et al. | |
| 2021/0092875 | A1* | 3/2021 | Hellmann-Regen | |
| | | | | H05K 7/20836 |
| 2021/0135959 | A1 | 5/2021 | Ricks et al. | |

OTHER PUBLICATIONS

Transcript with selected screenshots of "Vnish Smart Mine Antminer S9 Firmware Special Edition, Virus Blocking. Fee 1.7%-1.8%" video posted to Youtube May 21, 2019; <https://www.youtube.com/watch?v=Py9e7n73rtl>; accessed Mar. 29, 2021.

International Search Report and Written Opinion dated Nov. 6, 2020 related to corresponding application PCT/US2020/043088.

Taylor. "The Evolution of Bitcoin Hardware," IEEE Computer Society Sep. 2017, [retrieved on Sep. 20, 2020 from https:llcseweb.ucsd.edu/-mbtaylor/paperslTaylor_Bitcoin_IEEE_Computer 2017.pdf> pp. 1-9.

Managed Templates—Switch Managed Miner setting quickly, https://support.awesomeminer.com/support/solutions/articles/35000086012-managed-templates-switch-managed-miner-settings-quickly, Aug. 11, 2018; accessed Jan. 27, 2021.

Bitcoin Forum, Awesome Miner, https://bitcointalk.org/index.php?topic=676942.0, various dates starting Jul. 4, 2014; accessed Jan. 27, 2021.

Wenli, Fan et al. "Multi-attribute node importance evaluation method based on Gini-coefficient in complex power grids." let Generation Transmission & Distribution 10: 2027-2034. (Year: 2016)—Provided by USPTO in U.S. Appl. No. 16/707,964.

Aleksandr et al., English translation of RU-2681336-C1, "System for Monitoring Operating Parameters and Operation Conditions of a Farm for the Mining of Cryptotokens", pp. 1-5. Published Mar. 6, 2019. (Year: 2019)—Provided by USPTO in U.S. Appl. No. 16/707,964.

"A Mining System and its Operational Method". English translation of KR-20190108452-A. Published Sep. 24, 2019. (Year: 2019)—Provided by USPTO in U.S. Appl. No. 16/707,964.

Dotemoto, Philip. "FPGA Based Bitcoin Mining." (Year: 2014)—Provided by USPTO in U.S. Appl. No. 16/707,964.

Yang and Zhao. English translation of CN-208985656-A, "Pipeline Inspection Monitoring Method and Device", pp. 1-10. Published Dec. 11, 2018. (Year: 2018)—Provided by USPTO in U.S. Appl. No. 16/707,964.

Kraft, Daniel. "Difficulty control for blockchain-based consensus systems." Peer-to-Peer Networking and Applications 9: 397-413. (Year: 2016)—Provided by USPTO in U.S. Appl. No. 16/707,964.

Romiti, Matteo, et al. "A deep dive into bitcoin mining pools: An empirical analysis of mining shares." arXiv preprint arXiv:1905.05999. (Year: 2019).

Jung, Eunjin, etal. "Data mining-based ethereum fraud detection." 2019 IEEE International Conference on Blockchain (Blockchain). IEEE. (Year: 2019).

Kwon, Yujin, etal. "Impossibility of full decentralization in permissionless blockchains." Proceedings of the 1st ACM Conference on Advances in Financial Technologies. (Year: 2019).

Kim, Seoung Kyun, et al. "Measuring ethereum network peers." Proceedings of the Internet Measurement Conference 2018. (Year: 2018).

Canadian Office Action dated Mar. 16, 2022 for Canadian Patent Application No. 3,147,648.

* cited by examiner

SYSTEM AND METHOD FOR MANAGING COMPUTING DEVICES

CROSS-REFERENCE TO RELATED APPLICATIONS

This application claims priority to U.S. Provisional Patent Application Ser. No. 62/877,737, filed on Jul. 23, 2019, and titled "COMPUTING SYSTEM", the contents of which are hereby incorporated by reference in their entirety.

TECHNICAL FIELD

The present disclosure generally relates to the field of computing and, more particularly, to systems and methods for managing a plurality of different computing devices.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transaction into a ledger (the "blockchain") and rendered immutable (i.e., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to double spend a digital coin.

Cryptocurrency networks generally consist of many participants that repeatedly attempt to be the first to calculate a hash meeting the blockchain network's requirements. They receive a reward (e.g., a coin reward or transaction fee reward) that motivates them to continue participating (mining).

Many blockchain networks require computationally difficult problems to be solved as part of the hash calculation. The difficult problem requires a solution that is a piece of data which is difficult (costly, time-consuming) to produce but easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network typically operate computers called mining rigs or miners. Because of the difficulty involved and the amount of computation required, the miners are typically configured with specialized components that improve the speed at which hashes or other calculations required for the blockchain network are performed. Examples of specialized components include application specific integrated circuits (ASICs), field programmable gate arrays (FPGA), graphics processing units (GPUs) and accelerated processing unit (APUs).

Miners are often run for long periods of time at high frequencies that generate large amounts of heat. Even with cooling (e.g., high speed fans), the heat and constant operations can negatively impact the reliability and longevity of the components in the miner. ASIC miners for example often have large numbers of hashing chips (e.g., 100's) that are more likely to fail as temperatures rise.

Many participants in blockchain networks operate large numbers (e.g., 100's, 1000's or more) of different miners (e.g., different generations of miners from one manufacturer or different manufacturers) concurrently. These large numbers of miners can be difficult to manage. Operations such as changing the operating frequencies, voltage levels, and fan speeds can require burdensome amounts of time, particularly when apply the changes to large numbers of devices.

One reason for this is that current management solutions are limited in functionality. Many are only able to manage a particular model or brand of miner or device. Many are also difficult to use and require time consuming operations to apply changes to large numbers of devices at the same time.

Further complicating matters is that correctly configuring settings on devices like miners for optimum performance is difficult. Determining optimum configurations traditionally involves expert hardware engineers with an advanced understanding of how mining machines are built and function. Manipulating setting is often performed by changing and updating the device's firmware. For at least these reasons, there is a desire for a solution to allow easy management of large numbers of devices such as miners.

SUMMARY

A system and method for easily managing a data center with many computing devices such as miners, including for example tradition CPU-based devices as well as ASIC, GPU, and FPGA miners. The computing devices may be different models from different manufacturers. In one embodiment, the system comprises a first computer with a management application to manage the miners. The management application comprises a first module that periodically reads and stores status information from the plurality of networked computers, and a second module that provides a user interface. The user interface comprises multiple controls that are presented to the user. A first control enables the user to select one or more of the plurality of networked computing devices, and a second control enables the user to select a particular operating mode from a set of modes. The operating modes may include for example one or more of the following modes: a manual mode, a semi-automatic mode, an automatic mode, and an intelligent mode. In response to the user selecting one of the operating modes, the management application applies the selected operating mode to the selected devices.

In response to the manual mode being selected, the user may be presented with controls for setting device attributes on the selected devices. The attributes may include for example, chip frequency, chip voltage, and fan speed.

In the semi-automatic mode, the management application may analyze the stored performance data from the devices to determine a recommended setting and offer the user an opportunity to apply the recommended setting to the selected devices.

In automatic mode, the management application may also analyze the stored performance data from the devices to determine a recommended setting, but it may apply the recommended settings to the selected devices automatically, and periodically monitor the selected devices. In response to detecting a degradation in the selected devices, the management application may recalculate the recommended setting and automatically apply them.

The management application may also have a machine learning module that uses mixed integer linear programming to determines preferred settings for the selected devices based on current and stored status data.

A method for managing a plurality of computing devices such as miners is also contemplated. In one embodiment, the method comprises periodically collecting status information from the plurality of devices and providing a user interface for selecting one or more of the plurality of devices and an operating mode to be applied to the selected devices. As noted above, the operating modes may include for example manual, semi-automatic, automatic and intelligent modes.

In response to a user selecting the manual or expert mode option, controls are presented in the user interface controls for setting device attributes, including for example chip frequency, chip voltage, and fan speed. In some embodiments, entry of beyond safe operating range destructive settings may be permitted for the plurality of selected devices when in manual mode.

In response to a user selecting the semi-automated mode, periodic performance data may be stored for the each of the computing devices and analyzed to determine a recommended setting. The recommended setting may be shown to the user with a control option to apply the recommended setting to the selected devices.

In response to the automated mode being selected, the data may be stored and analyzed as above, but the recommended settings may be automatically applied to the selected devices, and the selected devices' status information may be monitored. In response to detecting a degradation in the selected devices, the recommended setting may be recalculated and new recommended settings applied.

In response to the selecting the intelligent mode, machine learning such as mixed integer linear programming may be applied the status data to determine the recommended settings. Additional parameters may also be collected and used to dynamically change settings at different points in the day to increase performance. The additional parameters may include for example temperature, humidity, dust levels, and chip health. These may in addition to the stored status information such as hash rate, power consumption, temperature. The recommended settings may include increasing device fan speed or reducing operating voltage and frequency in response to detecting higher dust concentrations. The recommended settings may also include decreasing device fan speed or increasing operating voltage and frequency in response to detecting higher humidity levels.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
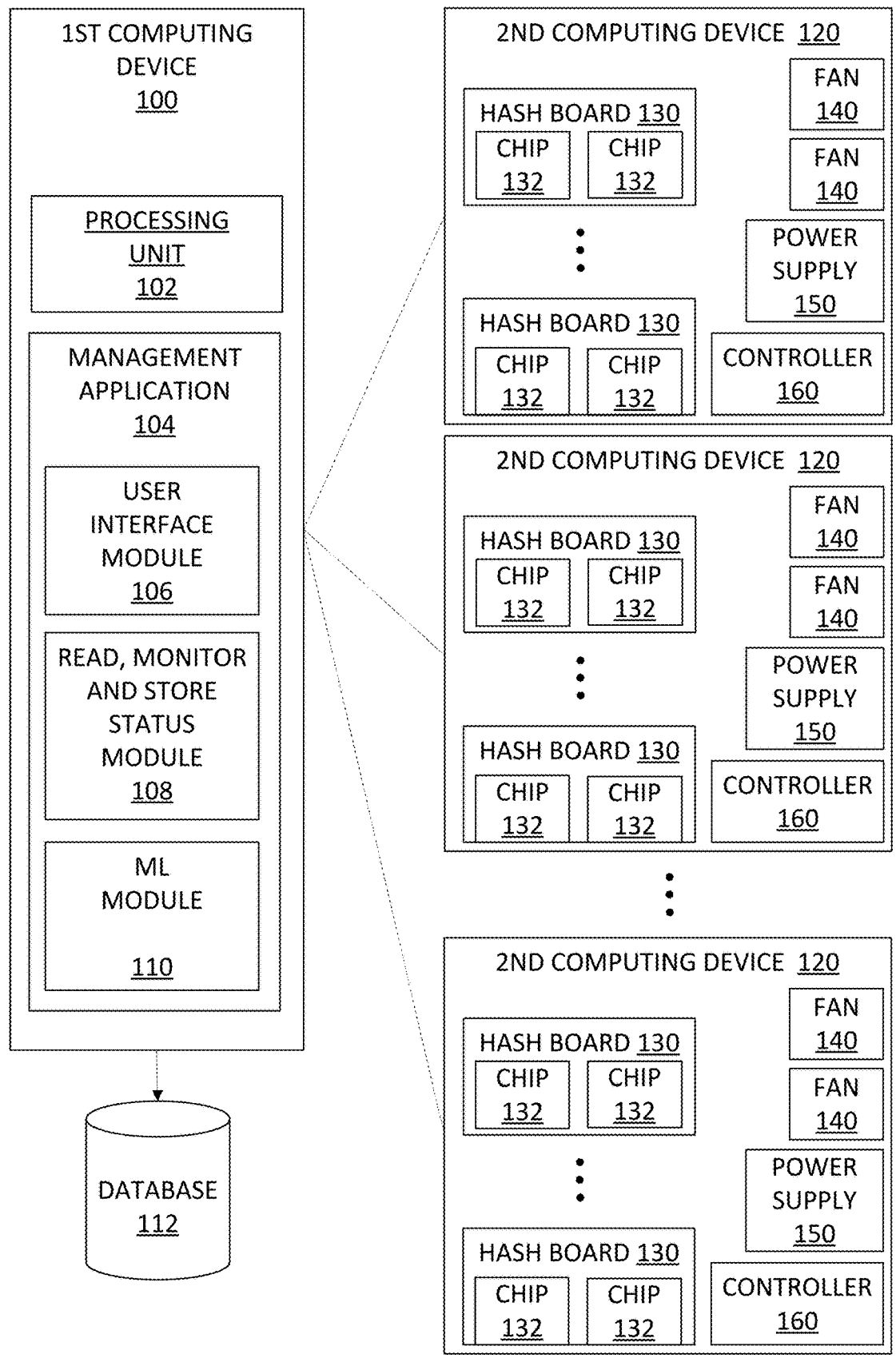
FIG. 1 is an illustration of one example embodiment of a system for managing a plurality of computing devices according to teachings of the present disclosure.

Referring now to FIG. 1, one embodiment of a system for managing computing devices such as miners is shown. This this embodiment, the system comprises a first computing device 100 configured for management and multiple second computing devices 102 configured to perform compute-intensive tasks such as calculating hash values for blockchain mining, e.g., Secure Hash Algorithm SHA-256.

First computing device 100 may include a processing unit 102 such as a traditional server or personal computer CPU configured to execute an operating system and management application 104. First computing device 100 may include and/or may be connected to human interface devices (e.g., a keyboard, a mouse, a display, such as an LED or LCD display, that may be configured as a touchscreen display, etc.). First computing device 100 may be configured to provide (e.g., display) information to one or more users via a user interface presented on a display. Additionally, first computing device 100 may also be configured to receive user input from via the user interface, such as a desired change for operating parameters or settings for one or more other computing devices (e.g., parameter changes) such as second computing devices 120.

Management application 104 is preferably implemented in software that runs on an operating system executing on first computing device 100. Management application 104 may be configured to communicate with second computing devices 120 via a network interface (e.g., ethernet or Wi-Fi) to receive status information and transmit configuration instructions. In one embodiment, management application 104 includes a module 108 configured to read, monitor, and store status (e.g., performance) information in a database 112. This allows management application 104 to perform analysis on the status information and spot trends over time.

Management application 104 may also include number of modules (e.g. routines, objects, or groups of routines or objects) such as an interface module 106 configured to display an interface and controls to users, as well as a machine learning (ML) module 110 that is configured to analyze the status information stored to database 112 to detect trends and calculate preferred settings for computing devices 120. Management application 104 may also be configured to collect performance data from second computing devices at each setting while tuning, provide an export (e.g., spreadsheet, Excel file, etc.) to analyze data, receive user selection of setting that is ideal for a group of second computing g, and/or apply these settings through UI of computing system.

In one embodiment, second computing devices 120 may include a power supply 150, a controller 160, one or more fans 140, and one or more compute boards like hash boards 130. Controller 160 is configured to handle communication external to second computing device 120, distribute compute tasks to hash boards 130. Controller 160 is also configured to receive results from computations from hash boards 130 and to control settings computing device 120 such as setting the speed that fans 140 operate at, and the voltage and frequencies that processing chips 132 on hash boards 130 operate at. Some of these may be set by controller 160 by communicating with power supply 150 and some of these may be set by controller 160 by communicating with components directly on hash boards 130.

In one embodiment, computing chips 132 are fixed-function application specific integrated circuits (ASICs) that are optimized for efficiently calculating hashes (e.g., SHA256), an operation that is useful for mining cryptocurrencies like Bitcoin that are based on proof of work (POW). In other embodiments, computing chips 132 may be graphic processing units (GPUs) or field programmable gate arrays (FPGAs), and controller 160 may also be configured to provide programming information for these more configurable devices (e.g., OpenCL for GPUs and VHDL or Verilog for FPGAs). In some embodiments with FPGAs or GPUs, second computing devices 120 may be configured to perform other types of compute operations, such as image processing, as part of a machine learning neural network.

Computing devices 120 need not be of the same type, and in many embodiments may comprise groups of devices of different model types from different manufactures. Different models provided by different manufacturers may be controlled in different ways. Some components of computing devices 120 may include voltage regulators, buck controllers, and/or MOSFETs, among others, which may be controlled individually by computing device 100 via respective controllers 160.

In one embodiment, management application 104 on first computing device 100 may be configured to provide a user interface comprising multiple screens, windows or pages that permit users to view status information for, and apply settings to, second computing devices 120. The windows may include graphic representations of the different models of second computing devices 100 as well as controls such as menus and icons that allow a user to select individual or sets of computing devices 120. For example, management application 104 may be configured to filter which of second computing devices 120 are presented based on ownership (e.g., only showing devices belonging to the current user accessing management application 104).

Figure 2:
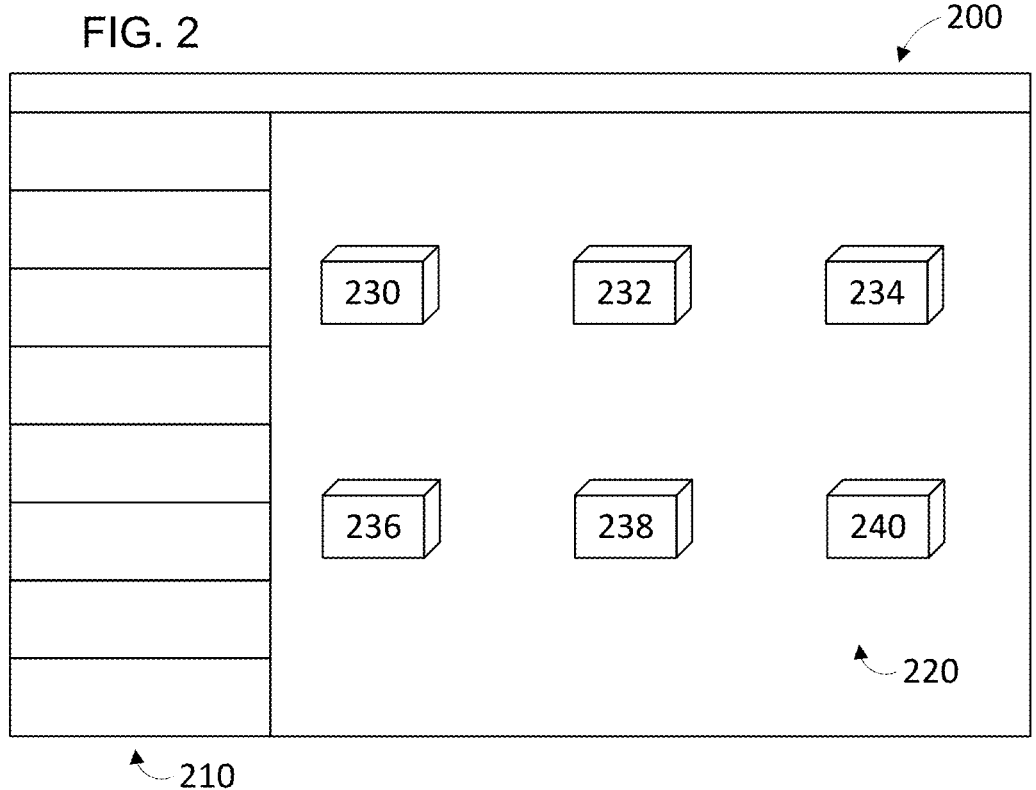
FIG. 2 is an illustration of one example embodiment of a first window of a user interface for a system for managing a plurality of computing devices according to teachings of the present disclosure.
Figure 3:
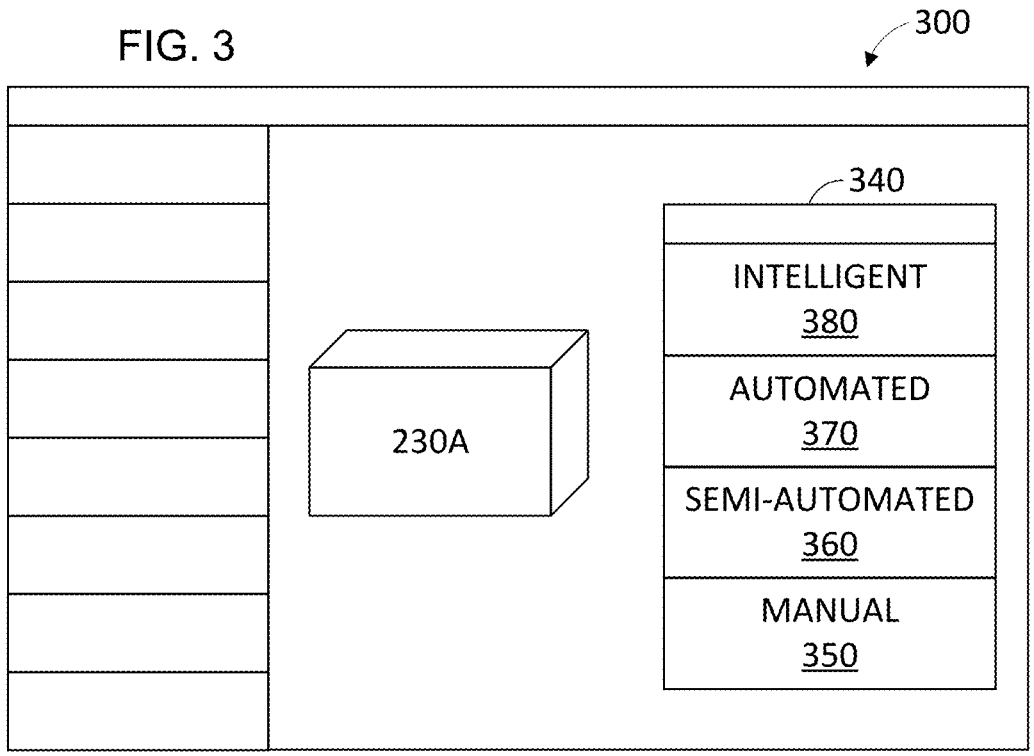
FIG. 3 is an illustration of one example embodiment of a second window of a user interface for a system for managing a plurality of computing devices according to teachings of the present disclosure.
Figure 4:
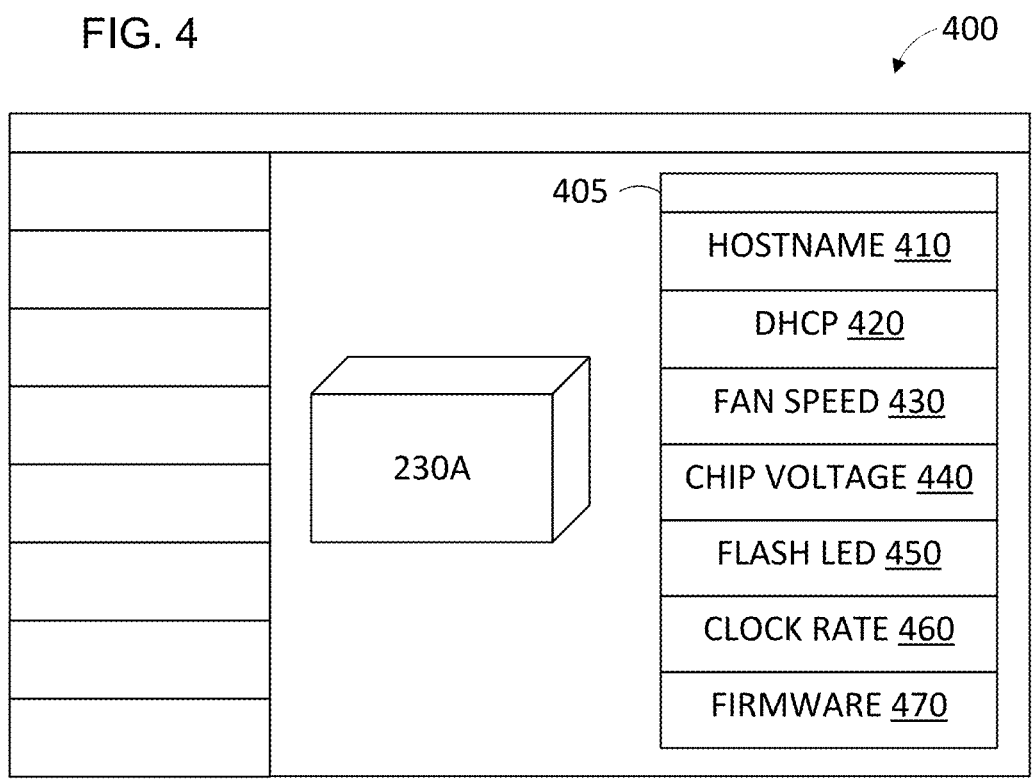
FIG. 4 is an illustration of one example embodiment of a third window of a user interface for a system for managing a plurality of computing devices according to teachings of the present disclosure.

Turning to FIG. 2-4, one example of a user interface presented by management application 104 is illustrated. In FIG. 2, a first window 200 is shown. Window 200 includes a menu 210 and a set of icons 230-240 that graphically represent individual or groups (e.g., one icon for each different model) of second computing devices 120. In response to the user selecting an individual or group of second computing devices 120 by for example clicking on one or more of icons 230-240, management application 104 may be configured to display a second window 300 as shown in FIG. 3.

Second window 300 may include a more detailed representation 230A of the selected individual or group of computing devices. In addition, second window 300 may also include a set of controls 340 that permit the user to specify an operation mode for the selected computing devices(s). In this example, the set of controls 340 include a control for setting an intelligent mode control 380, an automated mode control 370, a semi-automated mode control 360, and a manual mode control 350. Each of these modes provides a different option for managing second computing devices 120.

In response to selecting intelligent mode control 380, (e.g., an autopilot mode), the first computing device may be configured to automatically select computed settings and apply them to the selected one or more second computing devices 120. In addition to applying settings, management application 104 may also display status and performance information about the one or more selected second computing devices 120. Management application 104 may limit or prevent manual modifications (e.g., changes to parameters) to computing devices 120 in intelligent control mode, or may permit only non-operational parameters (e.g., pool configuration, host name, etc.) to be changed. This mode may particularly useful for notice users that knows little or nothing about mining and miners as management application 104 takes care of all settings and ongoing configuration management. Any settings presented may be presented in read-only mode, and any system warnings relative to settings may be disabled as management application 104 may be configured to avoid setting that negatively impact device reliability. In some embodiments, device representation 230A may be shown in an abstract state (e.g., without a breakout of the inner parts of the corresponding computing device(s).

In some embodiments, management application 104 may utilize machine learning (ML) module 110 in this mode to determine optimal settings for the selected devices. ML module 110 may periodically collect a set of parameters related to the selected second computing devices (e.g., fan speed, chip temperature, chip health, chip voltage, hardware errors, hash rate, share) and the surrounding environment (e.g., temperature, humidity, barometric pressure, dust levels), store them in database 112 and use the collected data to dynamically (e.g., periodically or at set times each day) change settings to improve or maximize performance. Example settings include clock rate, voltage levels, and fan speeds for the selected computing devices. For example, dust levels may negatively impact the ability of computing devices to cool themselves, while more humid air is able to hold more heat and therefore remove more heat from the chips (e.g., via moving over heatsinks attached to the chips 132). Changes in these values may require a recalculation of the recommended settings to address the change. For example an increase (for more dust) or decrease (for more humidity) in fan speed may be beneficial, of for a fixed fan speed a corresponding decrease (for more dust) or increase (for more humidity) in operating frequency and voltage of chips 132.

In some embodiments, management application 104 is configured to apply settings to the selected computing devices via one or more of the following techniques: (1) creating and transmitting via network connection configuration files to the selected computing devices, (2) connecting to the selected computing devices via network connection (e.g., SSH) and applying settings via the device's driver or mining application API (application programming interface), e.g., cgminer (an open source mining application) via RPC (remote procedure call), (3) connecting the selected computing device via its web interface and using web automated human interaction to apply settings, (4) by connecting to the device via network, updating the device's firmware file, and rebooting the device. In some embodiments, techniques (2) and (3) may also be used for reading data (e.g., current status and settings) from the selected computing devices.

In some embodiments, ML module 110 may be implemented using mixed integer linear programming (MILP), which involves determining solutions for problems in which only some of the variables are constrained to be integers (e.g., fan speed), while other variables (e.g., voltage levels) are allowed to be non-integers. In one embodiment, ML module 110 may be configured to optimize hash efficiency, e.g., hashrate (e.g., graph/sec) per watt, or Joule per terrahash "J/TH") based on some or all of the following variables: time, voltage level, frequency, temperature, fan speed, hash rate, hash difficulty. In some embodiments, additional networked environmental sensors may be installed near the selected second computing devices 120 to measure additional data that management application 104 can store to database 112 and that ML module 110 can then also use, for example, ambient temperature, humidity, barometric pressure, device power usage (e.g., by measuring current and voltage going into second computing devices 120), and dust concentration.

Many different MILP implementations can be used in implementing ML module 110, including for example, COIN|OR ("Common Optimization Interface for OR") or lp_solve (an open source MILP solver). Using one of these implementations, ML module 110 can read the stored data samples (as described above) from database 112 and then calculate an optimal set of settings based on current sensor readings. In some embodiments, when a new model of computing device 120 is connected, management application 104 may be configured to prompt the user installing the device to enter safe minimum and maximum values for certain settings (e.g., voltage, frequency, fan speed, operating temperature), and those limits can also be incorporated by ML module 110 to limit the solutions produced by the MILP implementation.

In one embodiment, the cost and expected lifespan of the second computing device 120 may also be requested as part of setup, along with and the estimated reward may be determined (e.g., based on the mining pool or cryptocurrency blockchain network being used). This information may be stored in database 112 and used by ML module to calculate settings in the context of optimizing net financial return. As will be appreciated by those skilled in the art, database 112 may be initialized with preliminary data for different second computing devices 120 so that ML module 110 can make recommendations as soon as new second computing devices 120 are added (even though database may not have a full store of historical status data for the device).

Running at hotter temperatures is likely to reduce the life expectancy of the computing device due to the effect on the electrical components. In one embodiment, an acceleration factor ($A_f$) of running at hotter temperatures can be derived from the Arrhenius question as shown in the example below in Equation 1 and used in ML module when optimizing net financial return.

$$A_f = e^{Ea/k(1/T_{use} - 1/T_{test})}, \text{ where} \qquad \text{Equation 1:}$$

Ea=Activation Energy, e.g., 0.7 eV,
k (Boltzmann's Constant)=8.167×10$^{-5}$ eV/° K
$T_{use}$=Normal Use Temperature (e.g., 328° K)
$T_{test}$=Elevated Temperature (in ° K).

When managing second computing devices 120 using the intelligent mode, management application 104 may be configured to perform tuning of the selected second The frequency of such additional tuning (beyond a first tuning), may however be limited with some types of compute devices (e.g., where the selected computing device must be repeatedly reset to apply changed settings and where the selected computing device boots very slowly or has reliability issues when being reset).

In response to selecting automated mode control 370, management application 104 may be configured to determine an optimal setting as noted above, but only apply it once. Additionally, the computing system may automatically apply the recommended setting and send a notification to the user about the setting change.

In some embodiments, management application 104 may also include an automatic healing function that may monitor the second computing devices 120 and conduct tuning if the performance of the second computing device 120 degrades, and/or may apply a different recommended setting to maximize performance at any given point in time.

In response to selecting semi-automated mode control 360, the management application 104 may be configured to automatically control the one or more second computing devices 120 and may permit some degree of changes to be made to the other computing devices by the user. In this mode, the management application may prevent attempted changes that are outside of certain thresholds, such as changes that are expected to be harmful to the selected second computing devices 120. Additionally or alternatively, in this mode, the management application 104 may receive a user's requested change to a first parameter and may automatically change it such as to avoid damage to the second computing device 120.

In some embodiments, management application 104 may also automatically analyze the performance data from the selected second computing devices 120 and provide a recommend/optimal setting at a second computing device level. The user may review and/or apply recommendations through management application's user interface.

In response to selecting manual mode control 350 (also known as expert mode), management application 104 may be configured to display a third window 400 for manually tuning settings on the selected computing device(s) (one at a time or in bulk) as shown in FIG. 4. In this example, the window 400 comprising a set of controls 405 that permit the user to manually set a number of different settings for the corresponding selected second computing devices 120. The control set 405 may include controls for setting the device's hostname 410, DHCP 420, one or more fan speeds 430, one or more chip voltages 440, flashing a status LED 450, clock rate 460, and updating firmware 470.

For example, if a user specifies a change of a frequency for one or more chip 132, the first computing device 100 through management application 104 may automatically change the voltage of the chip 132 to match the specified change in frequency. In the non-manual modes, the management application 104 may not present or activate certain control options (e.g., may gray them out). Elements/components that can be modified may be selectable.

Because of the considerable electrical throughput and heat generation that may be associated with second computing devices 120, there may be some frequency (e.g., overclocking) and fan settings that can degrade or disable components of second computing devices 120. In some embodiments, management application 104 may warn the user if settings outside a predetermined safe range are applied, but if the user has selected manual mode (i.e., expert mode) those warnings may be overridden by the user. For example, if the user knows that the selected second computing devices 120 have minimal useful life remaining because new faster and more efficient models are soon to be released by the manufacturer, the user may intentionally want to select higher frequencies and voltages despite their impact on the MTTF.

In some embodiments, the management application 104 may be configured to simulate the effects of requested changes before applying them. For example and without limitation, database 112 may be prepopulated with (or management application 104 may obtain via network interface) models of the one or more second computing devices 120 and may be configured to model the requested change for the corresponding computing device and provide simulated results for the requested change. The simulated results may, for example and without limitation, include an indication of any damage or estimated reduction in the estimated remaining lifespan in the other computing device.

In some embodiments, some settings (e.g., chip frequency and voltage), may be configured as being related and interdependent. In those embodiments, settings that are dependent on the proper configuration of another setting may be automatically enforced by the management application 104 when in intelligent, automatic and semi-automatic modes, but not manual mode (although a warning may be displayed when a possible destructive, out of range setting is specified).

Figure 5:
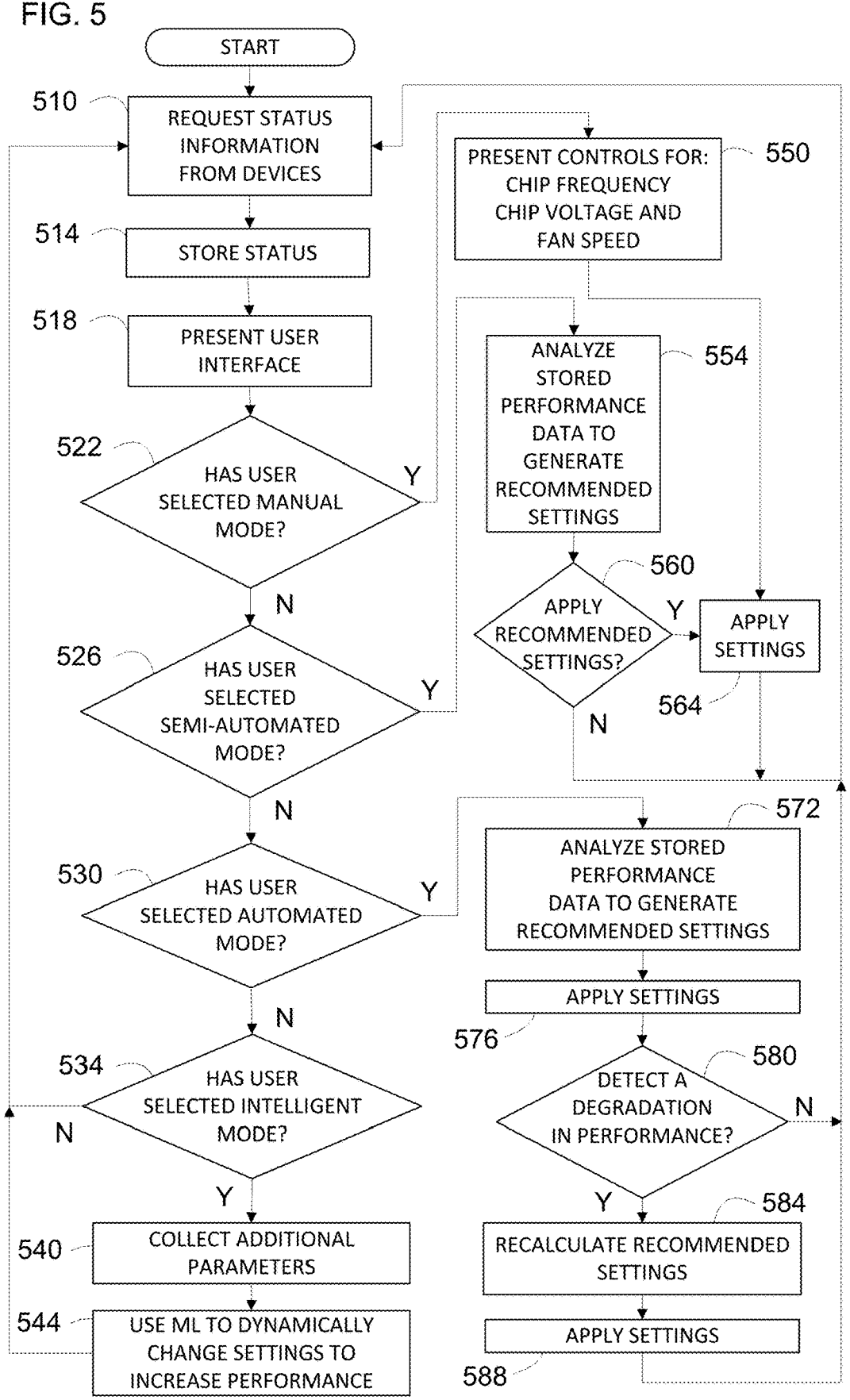
FIG. 5 is a flowchart illustrating an example embodiment of a method for managing a plurality of computing devices according to teachings of the present disclosure.

Turning now to FIG. 5, one example embodiment of a method for managing a group of computing devices is shown. Status information is requested from the device or devices being managed (step 510). As noted above, this status information may include, for example, device temperature, hash rate, fan speed, voltage levels, frequencies, and chip status. In some embodiments, additional environmental information about the managed devices (but not necessarily from the managed devices) may also requested, such as power usage (e.g., from a network-capable power supply), humidity (from a network-capable humidity monitor located near the managed devices), and dust concentration. This collected status information is stored (step 514). A user interface is presented to the use (step 518) which enables the user to select from a set of different management modes for the managed devices.

If the user selects a manual or expert mode (step 522), the user is presented with controls for selected device settings, for example chip frequency, chip voltage, and fan speed (step 550). The user's specified settings are them applied to the managed devices (step 564).

If the user selects a semi-automatic mode (step 526), the stored performance date is analyzed to generate recommended settings (step 554). As noted above, the analysis may be performed by using machine learning and mixed integer linear programming (MILP) to select settings that optimize hashrate or hashrate efficiency or net financial return based on the stored historical status data. If the user elects to apply the recommended settings (step 560), the settings are applied to the managed devices (step 564).

If the user selects an automated mode (step 530), the stored performance date is analyzed to generate recommended settings (step 572) which are then automatically applied to the managed devices (step 576). The managed devices are monitored, and if a degradation in performance is detected (step 580), new recommended settings are calculated (step 584) and applied (step 588).

If the user selects an intelligent or autopilot mode (step 534), additional parameters may be collected (step 540) and then machine learning may be used to periodically dynamically change settings to increased performance (step 544).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for managing a plurality of computing devices, the method comprising:
   periodically collecting status information from the plurality of devices;
   providing a user interface comprising:
      a first control to select one or more of the plurality of devices, and
      a second control to select one of a plurality of operating modes, wherein the operating modes comprise:
         a manual mode; and
         an intelligent mode;
   in response to one of the operating modes being selected, applying the selected operating mode to the selected devices; and
   in response to the intelligent mode being selected, preventing manual modification of operational parameters and permitting modifications of non-operational parameters.

2. The method of claim 1, wherein the operating modes further comprise:
   a semi-automated mode; and
   an automated mode.

3. The method of claim 1, further comprising:
   in response to a user selecting the manual mode option, presenting in the user interface controls for setting the following device attributes:
      chip frequency,
      chip voltage, and
      fan speed.

4. The method of claim 2, further comprising:
   periodically storing performance data for the each of the computing devices,
   analyzing the stored performance data to determine a recommended setting, and
   in response to the semi-automated mode being selected, presenting the recommended setting and displaying a control to apply the recommended setting to the selected devices.

5. The method of claim 2, further comprising:
   periodically storing performance data for the each of the computing devices,
   analyzing the stored performance data to determine a recommended setting, and
   in response to the automated mode being selected, applying the recommended setting to the selected devices, and
   monitoring the status information, and
   in response to detecting a degradation in the selected devices:
      recalculating the recommended setting, and
      applying the recalculated recommended setting.

6. The method of claim 1, further comprising:
   collecting additional parameters,
   using the additional parameters to dynamically change settings at different points in the day to increase performance.

7. The method of claim 6, further comprising:
   applying machine learning to the status information.

8. The method of claim 6, wherein the additional parameters comprise temperature, humidity, dust levels, hash rate, and chip health.

9. A system for managing a data center with a plurality of networked computers, the system comprising:
   a management application executable on one of the plurality of computers, wherein the management application comprises:
      a first module that periodically reads and stores status information from the plurality of networked computers, and
      a second module operable to provide a user interface, wherein the user interface comprises:
         a first control to select one or more of the plurality of networked computers, and
         a second control to select one of a plurality of operating modes, wherein the operating modes comprise:
            a manual mode, and
            an intelligent mode,
      wherein in response to one of the operating modes being selected, the management application is configured to apply the selected operating mode to the selected networked computers; and
      in response to the intelligent mode being selected, the management application is configured to prevent manual modification of operational parameters and permit modifications of non-operational parameters.

10. The system of claim 9, wherein the operating modes further comprise:
    a semi-automated mode; and
    an automated mode.

11. The system of claim 9, wherein the second module, in response to a user selecting the manual mode option, presents in the user interface controls for setting the following device attributes: chip frequency, chip voltage, and fan speed.

12. The system of claim 10, wherein the first module:
    periodically stores performance data for the each of the networked computers analyzes the stored performance data to determine a recommended setting, and in response to the semi-automated mode being selected:
presents the recommended setting; and
displays a control to apply the recommended setting to the selected networked computers.

13. The system of claim 10, wherein the first module:
periodically stores and monitors performance data for the each of the networked computers;
analyzes the stored performance data to determine a recommended setting, and
in response to the automated mode being selected, and, in response to detecting a degradation in the selected networked computers:
recalculates the recommended setting, and
automatically applies the recalculated recommended setting.

14. The system of claim 10, further comprising:
a machine learning module that based on stored data determines preferred settings for the networked computers based on current status data to optimize hash efficiency.

15. A method for managing a plurality of computing devices, the method comprising:
periodically collecting status information from the plurality of devices;
providing a user interface comprising:
a first control to select one or more of the plurality of devices, and
a second control to select one of a plurality of operating modes, wherein the operating modes comprise:
a manual mode; and
an intelligent mode; and in response to the intelligent mode being selected, periodically selecting a preferred set of device settings by using a mixed integer linear programming to optimize operation of the plurality of computing devices.

16. The method of claim 15,
in response to the intelligent mode being selected, preventing manual modification of operational parameters and permitting modifications of non-operational parameters.

17. The method of claim 15, wherein the status information comprises hash rate, power consumption, and temperature.

18. The method of claim 15, wherein the status information further comprises measurements of dust concentration, and the method further comprises in response to the intelligent mode being selected and detecting higher dust concentrations:
a. increasing a fan speed; or
b. reducing operating voltage and frequency.

19. The method of claim 15, wherein the status information further comprises measurements of humidity, and the method further comprises in response to the intelligent mode being selected and detecting humidity:
a. decreasing fan speed; or
b. increasing operating voltage and frequency.

20. The method of claim 15, further comprising:
in response to the manual mode being selected, permitting entry of beyond safe operating range destructive settings for the plurality of selected devices.

* * * * *